(12) United States Patent
Villella et al.

(10) Patent No.: US 7,444,222 B2
Villella et al.
(45) Date of Patent: Oct. 28, 2008

(54) METHOD AND APPARATUS FOR GENERATING A CORNERING-CORRECTED ELSD CONTROL SIGNAL

(75) Inventors: Matthew G. Villella, Hermosa Beach, CA (US); Edmund F. Gaffney, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 211 days.

(21) Appl. No.: 11/536,218

(22) Filed: Sep. 28, 2006

(65) Prior Publication Data

US 2008/0082243 A1    Apr. 3, 2008

(51) Int. Cl.
*G06D 1/00* (2006.01)
(52) U.S. Cl. .............................. 701/70; 701/69; 701/82; 701/88
(58) Field of Classification Search .................. 701/38, 701/53, 69, 70, 82, 88; 475/231, 150, 88; 192/30 W, 35, 85 A, 446, 93 A, 110 B, 103
See application file for complete search history.

(56) References Cited

U.S. PATENT DOCUMENTS 7,276,014 B2 * 10/2007 Goto et al. ..................... 477/94
7,294,086 B2 * 11/2007 Brissenden et al. ......... 475/231
7,357,748 B2 *  4/2008 Kelley, Jr. ................... 475/231

* cited by examiner

*Primary Examiner*—Richard M. Camby

(57) ABSTRACT

Methods and apparatus are provided for generating a slip control for an active driveline device (such as an electronic limited slip differential (eLSD)) that corrects for longitudinal tire slip in the turning wheels of a vehicle. Indicia of a yaw rate of the vehicle are obtained by the eLSD, which then determining a target velocity difference for the turning wheels based at least in upon the yaw rate, along with other factors such as difference in wheel rotation speed or the wheel-road angle of the vehicle. Using these measured parameters, a slip control signal can be applied to the eLSD as a function of the determined target velocity difference.

20 Claims, 2 Drawing Sheets

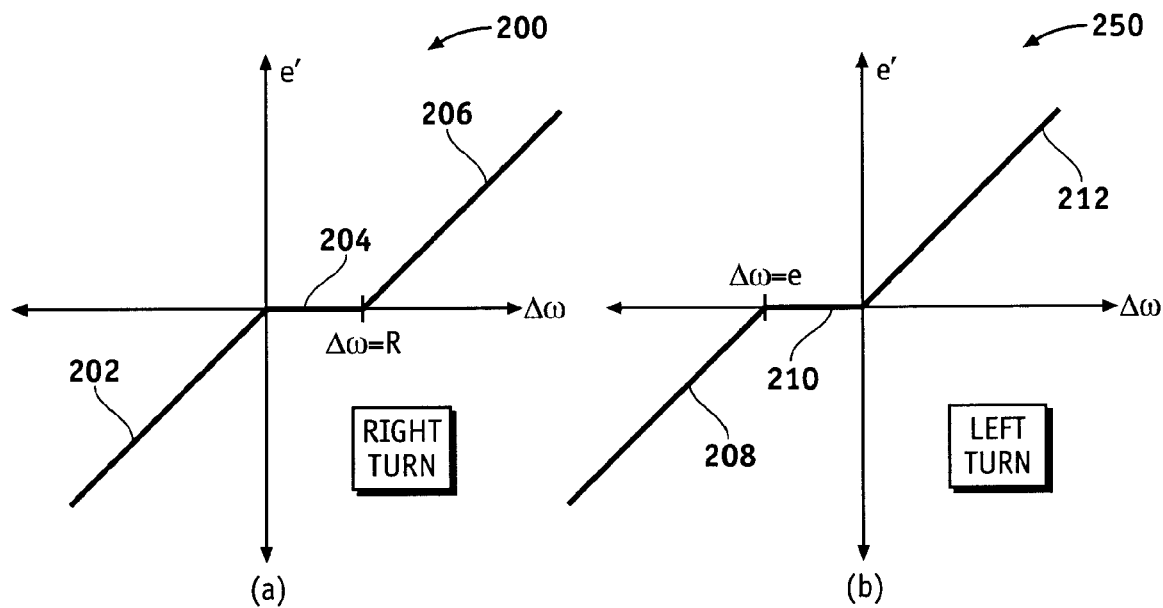
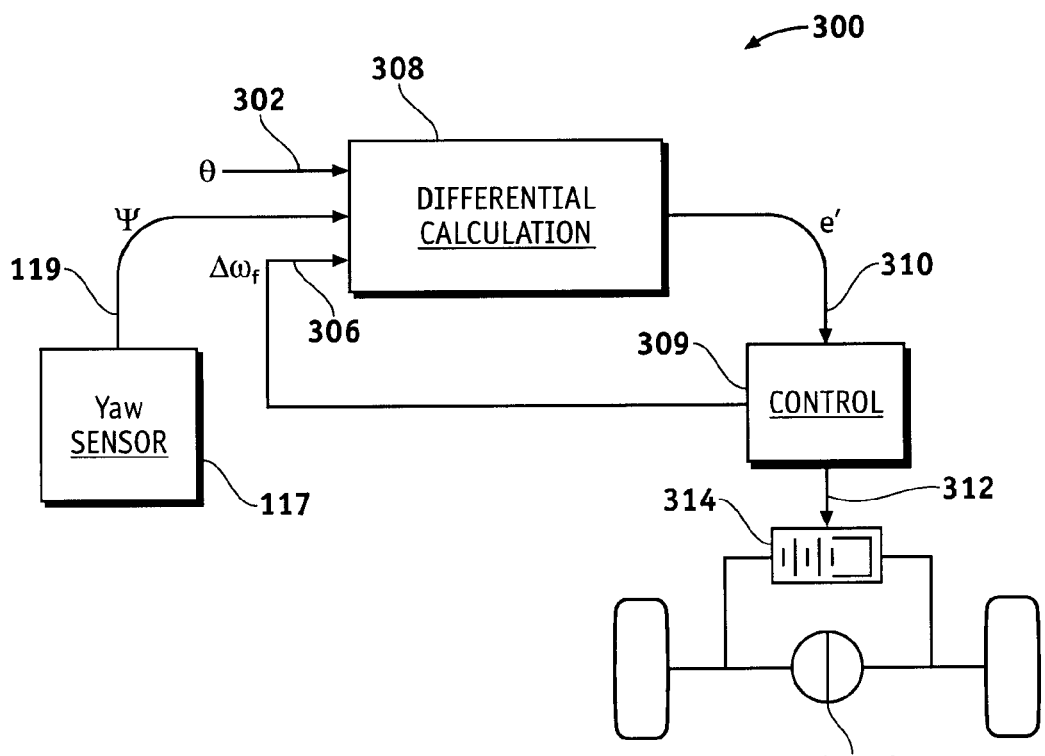
FIG. 3

METHOD AND APPARATUS FOR GENERATING A CORNERING-CORRECTED ELSD CONTROL SIGNAL

TECHNICAL FIELD

The present invention generally relates to control of a limited slip differential in a vehicle, and more particularly relates to the generation of a slip control signal for an electronically-controlled limited slip differential for a vehicle.

BACKGROUND OF THE INVENTION

When a conventional vehicle such as a passenger automobile or truck turns, each of the four wheels on the vehicle can rotate at different speeds. The wheels on the side of the vehicle facing into the turn, for example, typically spin at a slower rate than those on the outside of the turn due to the shorter distance traversed by the inside wheels. Front and rear wheels similarly traverse different distances around the radius of the turn, thereby resulting in unequal turning speeds. For non-driven wheels (e.g., the front wheels in a rear-wheel-drive automobile), the difference in speed is easily accommodated. For wheels that are driven with engine torque, however, the wheels must be mechanically allowed to spin at different rates to prevent spinning or slippage of one or more wheels.

To inhibit the potential for wheel spin, various types of differential driveline devices have been used to control the distribution of torque from the vehicle engine to the spinning shafts attached to each wheel. Each set of driven wheels in a modern vehicle typically contains at least one differential. Front wheel drive (FWD) vehicles, for example, typically include front differentials that allow the front wheels to turn at different speeds. Rear wheel drive (RWD) vehicles similarly include rear differentials that allow rear wheels to turn at different speeds. Four-wheel drive (4WD) vehicles typically include both front and rear differentials. Additionally, all wheel drive (AWD) and full-time 4WD vehicles typically include center differentials that allow the front and rear wheels to rotate at different rates during turns.

More recently, active driveline devices commonly known as electronically-controlled limited slip differentials (eLSD) have become increasingly popular. Typically, the eLSD include a slip control algorithm that provides controlled variable coupling of the engine's driving torque to two or more of the vehicle wheels through the use of an electrically actuated clutch. Under normal driving conditions, such eLSDs typically function as open differentials that evenly distribute torque to the wheel shafts. When a loss of traction is sensed at one output of the differential, however, the eLSD clutch can be activated via a feedback control loop to maintain a speed difference between the differential outputs that would result as if the wheels were rotating at their natural speeds, thereby improving the stability and comfort of the vehicle.

Generally speaking, most eLSD implementations use vehicle reference speeds to calculate appropriate control values for the differential outputs. Challenges often arise, however, in that accurate vehicle reference speed measurements can be difficult to obtain in practice. eLSD computations that determine desired wheel speed based upon vehicle reference speeds, then, can occasionally produce driver discomfort or other undesired results. In particular, vehicle investigations have shown that even slight differences in the determination of target wheel speed can result in improper clutch activation during low-speed, tight-turn applications such as parking-lot maneuvers and the like.

Accordingly, it is desirable to provide methods and devices for determining target wheel velocities that are independent of vehicle reference speed, and that will enable the slip control algorithm of an eLSD to correct for longitudinal tire slip, especially in tight turn situations. In addition, it is desirable to provide eLSD corrections for front, center, and rear driveline device applications. Furthermore, other desirable features and characteristics of the present invention will become apparent from the subsequent detailed description and the appended claims, taken in conjunction with the accompanying drawings and the foregoing technical field and background.

SUMMARY OF THE INVENTION

According to various exemplary embodiments, a new technique is provided for generating a slip control for an electronically-controlled limited slip differential (eLSD) that provides torque distribution to the turning wheels of a vehicle. In one embodiment, the method comprising the broad steps of obtaining indicia of a yaw rate of the vehicle, determining a target velocity difference for the turning wheels at least in part as a function of the yaw rate, and applying the slip control signal to the eLSD as a function of the determined target velocity difference. Because the target velocity differences are computed based upon yaw rate, wheel rotation speeds, road-wheel angles and/or other factors that can be readily determined, the need to measure a forward or lateral velocity of the vehicle is significantly diminished.

In other exemplary embodiments, an electronically-controlled limited slip differential (eLSD) system suitably distributes torque between a first shaft and a second shaft connected to wheels of a vehicle. An electronically-controlled clutch couples the first and second shaft and regulates the relative rotation thereof in response to a control signal. Differential calculation logic appropriately receives indicia of a vehicle yaw rate and a speed difference between the first and second shafts, and determines a target velocity difference for the first and second shafts at least in part as a function of the yaw rate and the speed difference. This indication of the target velocity difference can then be provided to control logic coupled to the clutch that provides the control signal thereto as a function of the target velocity difference.

These and other aspects of the present invention will become more apparent from the detailed description below.

DESCRIPTION OF THE DRAWINGS

The present invention will hereinafter be described in conjunction with the following drawing figures, wherein like numerals denote like elements.

FIG. 2 is a graph showing an exemplary embodiment of difference function switching for right and left turning vehicles; and FIG. 3 is a block diagram of an exemplary control system for an electronic limited slip differential.

DESCRIPTION OF EXEMPLARY EMBODIMENT

Figure 1:
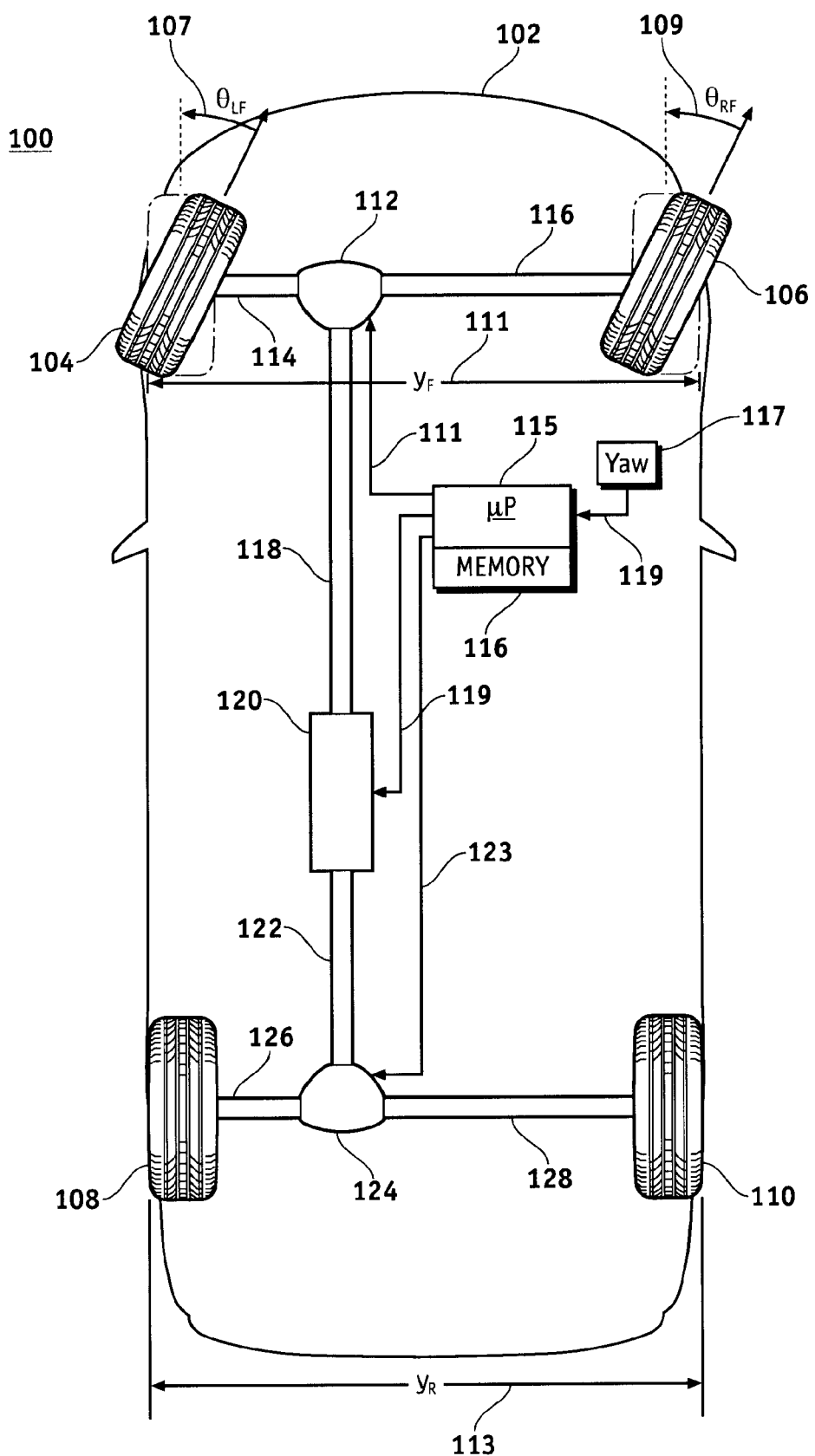
FIG. 1 is a block diagram of an exemplary vehicle with front, rear and center electronically-controlled limited slip differential systems.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments pertain to dynamic stability control of a turning vehicle. A slip control algorithm that is independent of vehicle reference speed is developed for an electronically-controlled limited slip differential (eLSD). The slip control algorithm is based on the difference between a calculated target delta-velocity and the measured difference in wheel speeds. The target delta-velocity can be derived from measured road-wheel angle and vehicle yaw rate information, and is therefore independent of vehicle reference speed, which can be difficult to measure in practice. In various embodiments, a difference term computed from the slip control algorithm is used by the eLSD to adjust the driving torque distribution to the turning wheels to reduce adverse effects such as longitudinal tire slip.

With reference now to FIG. 1, an exemplary dynamic traction control system for a vehicle 102 suitably includes a controller 115 that provides one or more control signals 111, 119, 123 to a front differential 112, center differential 120 and/or rear differential 124 as appropriate to correct relative rotational velocities of wheels 104, 106, 108 and/or 110. Each differential appropriately corrects the relative rotational velocity of two shafts (e.g. shafts 114 and 116 for front differential 112, shafts 126 and 128 for rear differential 124, and shafts 118 and 122 for center differential 120) to reduce or prevent wheel slippage during turns and other maneuvers. Typically, each differential 112, 120, 124 includes an electronically-actuated clutch that slows the speed of one shaft with respect to the other in response to signals 111, 119 and/or 123. In practice, it can be beneficial to introduce a difference term (referenced herein as "e") to the control of each differential under certain conditions to compensate for differences in turn radii experienced by the multiple wheels of the vehicle.

Control module 115 may be implemented with any type of control circuitry such as any type of microprocessor, microcontroller, application specific integrated circuit (ASIC), programmed logic array and/or the like, with various logical functions implemented with any combination of hardware, software and/or firmware. In a typical application, control module 115 is microcontroller with associated digital memory 116 for storing data and/or executable instructions as appropriate. Although FIG. 1 shows a single eLSD control module 115 controlling three differentials 112, 120 and 124, in practice, each differential may be controlled by any number of separate and/or integrated control circuitry operating in any manner.

Steering geometry 100 includes kinematic motion variables as depicted in FIG. 1 that can be used to develop longitudinal tire slip relationships. Using conventional automotive engineering principles (set forth, for example, in Thomas T. Gillespie's "Fundamentals of Vehicle Dynamics", Society of Automotive Engineers, USA, 1992), the equations defining longitudinal tire slip for each of the four wheels 104, 106, 108, 110 can be shown to be (respectively):

$$(v_x + \psi y_{LF})\cos\theta_{LF} + (v_y + x_F)\sin\theta_{LF} - \omega_{LF} r = 0 \quad (1)$$

$$(v_x + \psi y_{RF})\cos\theta_{RF} + (v_y + x_F)\sin\theta_{RF} - \omega_{RF} r = 0 \quad (2)$$

$$v_x + \psi y_{LR} - \omega_{LR} r = 0 \quad (3)$$

$$v_x - \psi y_{RR} - \omega_{RR} r = 0 \quad (4)$$

where $v_x$ is the longitudinal speed, $v_y$ is the lateral speed, and $\psi$ is the yaw rate of vehicle 102. The variables $y_{LF}$, $y_{RF}$, $y_{LR}$ and $y_{RR}$ are the track widths to each wheel 104, 106, 110 and 112, respectively, as measured from the longitudinal mass axis that passes through the center of gravity of vehicle 102, and $\theta_{LF}$ is the left road-wheel angle 107 and $\theta_{RF}$ is the right road-wheel angle 109 of turning wheels 104 and 106, respectively. The variables $\omega_{LF}$, $\omega_{RF}$, $\omega_{LF}$ and $\omega_{RF}$ are the wheel rotational velocities of left front wheel 104, right front wheel 106, left rear wheel 108 and right rear wheel 110, respectively. Finally, the variable r is the wheel radius (which is shown in equations 1-4 to be identical for all wheels, although this is not necessarily true in all embodiments), and $x_F$ is the front wheelbase.

As stated above, it is desirable to develop a slip control algorithm for an eLSD that is independent of vehicle reference speed due to the difficulty in obtaining accurate values of longitudinal and lateral velocities. To this end, Equations (1)-(4) can be utilized to eliminate the velocity terms in the determination of target delta-velocity. In the case of the rear differential 124, for example, a target delta-velocity between shafts 126 and 128 can be assumed to be equal to the difference between equations 3 and 4. Stated algebraically:

$$(y_{LR} + y_{RR})\psi - (\omega_{LR} - \omega_{RR}) r = 0 \quad (5)$$

or $$\Delta\omega_R = \frac{y_R \psi}{r} \quad (6)$$

where "$\Delta\omega_R$" represents the target delta velocity and "$y_R$" is simply the rear track width 113. Through similar manipulation of Equations (1) and (2) above (and assuming for simplicity in this case that the right and left road wheel angles 107 and 109 are equal to each other, although this assumption is not necessary in all embodiments), the target delta velocity ($\Delta\omega_F$) between shafts 114 and 116 of front differential 112 simplifies to:

$$\Delta\omega_F = \frac{y_F \psi}{r}\cos\theta \quad (7)$$

where "$y_F$" is the front track width 111 and $\theta$ is represents the common road track angle 107, 109.

In Equations (6) and (7), only directly-measured parameters (i.e. wheel radius r, vehicle yaw rate $\psi$, track widths $y_F$ and $y_R$, and front road-wheel angle $\theta$) are used in the target delta velocity calculations. Vehicle yaw rate $\psi$, for example, can be directly measured from a gyroscope or other rotation/yaw sensor 117, as noted above. Wheel road angles are similarly readily computed using conventional vehicle sensors. Wheel radius and track widths, although somewhat configurable by the customer, are relatively unchanging, and can therefore be conveniently assumed to be relatively constant in most cases. Even in the event that the consumer changes one or more of these parameters (e.g. by equipping vehicle 102 with new tires that produce a different wheel radius than the originally-installed tires), it can be expected that such changes are rare occurrences at best that can be remedied by simply updating the proper values for such factors stored in controller 115, memory 116 and/or the like. Because the target delta velocities are based solely upon directly-measured or relatively constant parameters, the target delta-velocities computed from Equations (6) and (7) have been shown to be more accurate than those computed based upon computed vehicle velocities.

The development of an equation for center differential target delta-velocity can be slightly more complicated than the computations for front and rear differentials due to the effect of vehicle sideslip. Since vehicle sideslip is generally a function of vehicle velocity, the accurate computation of sideslip angle and its impact can become difficult due to the previously-noted difficulty of measuring velocity parameters accurately. Nevertheless, an exemplary equation for calculating center target delta-velocity ($\Delta\omega c$) can be developed with directly-measured parameters such as wheel-road angle and yaw rate, but also with an approximation for the sideslip effect.

As a first step in the development of a center target delta-velocity relationship for a vehicle 102, the total zero longitudinal slip relationships for the front and rear axles can be determined by adding the terms of Equation (1) to the terms of Equation (2) for the front axle, and by adding the terms of Equation (3) to the terms of Equation (4) for the rear axle. Because the average wheel speeds of the front axle 114/116 and rear axle 126/128 correspond to the speeds of shafts 118 and 122 (respectively) of center differential 120, the center target delta-velocity can be algebraically expressed as:

$$\omega_F - \omega_R \cos\Theta = \frac{v_y + \psi x_F}{r} \sin\Theta \quad (8)$$

Equation (8) contains a number of assumptions (e.g. that vehicle 102 is configured with the center of gravity located on the longitudinal geometric axis, that left and right track widths are approximately equal for each axle, and that road-wheel angles for left and right front wheels ($\theta_{LF}$, $\theta_{RF}$, respectively) are approximately equal) for purposes of illustration. Although these assumptions do simplify the mathematics, they are not necessary to the implementation of the concepts set forth herein. Equation (8) does contain one disadvantage, however, in that at least one lateral velocity term (i.e. $v_y$) remains. By assuming that lateral velocity is proportional to yaw rate (i.e. that $v_y = k\psi$), however, and combining the constant of proportionality (k) with the front wheelbase ($x_F$), the center target delta-velocity with an approximation of lateral velocity can be expressed as:

$$\omega_F - \omega_R \cos\Theta = \frac{k'\psi}{r} \sin\Theta \quad (9)$$

The constant k' can be readily calibrated for a specific vehicle application. This can generally be done, for example, by adjusting the parameter in real-time during the design or testing of vehicle 102 until both sides of Equation (9) match. Alternatively, actual vehicle performance could be monitored over a time period, with an average or median value of k' determined empirically. In still further embodiments, different values of k' could be computed and applied during different vehicle maneuvers (e.g. hard turn, soft turn, no turn, left vs. right turns, etc.), although this feature need not be implemented in all embodiments.

The equations for rear, front, and center tractive effort control (Equations 6, 7, 9, respectively) developed above generally hold true when vehicle traction is maintained. However, this is not always the case in practice. For example, if the wheels on a vehicle begin to slip (wheel spin-up), the equalities in Equations 6, 7 and/or 9 may not be maintained. In such situations, Equations 6, 7 and/or 9 can be rewritten in terms of the difference due to loss of tractive capability for rear, front and center differentials 124, 112, 120 (respectively) as follows:

$$\text{Rear:} \quad e_R = \Delta\omega_R - \frac{y_R \psi}{r} \quad (10)$$

$$\text{Front:} \quad e_F = \Delta\omega_F - \frac{y_F \psi}{r} \cos\theta \quad (11)$$

$$\text{Center:} \quad e_C = \omega_F - \omega_R \cos\Theta - \frac{k'\psi}{r} \sin\Theta \quad (12)$$

In theory, vehicle stability could be significantly improved by simply driving an appropriate difference (e) to the shafts of each differential 112, 120, 124 to compensate for differences in wheel spin represented by Equations (9)-(11). In practice, however, a linear type of tractive effort control driven by the difference terms $e_F$, $e_R$, $e_C$ described above may be difficult to implement due to conventional actuation of driveline clutches used in most differentials. That is, most clutches operate by reducing the speed difference between the two shafts rather than directly driving the computed difference between the shafts, making it difficult to directly apply the raw difference values computed above in some circumstances. In the case of front or rear eLSDs, for example, if the inside wheel in a turn were to slip, but the wheel speed did not exceed the speed of the outside non-slipping wheel, then conventional clutch actuation could theoretically increase the amount of slip. In the case of a center clutch, rear axle slip would typically drive the rear prop-shaft speed higher, but if that speed remained below the front prop-shaft speed, actuation of the center clutch would tend to cause an increase in rear axle slip.

An exemplary solution to this issue can be achieved by determining whether to use the difference terms ($e_F$, $e_R$, $e_C$) or the actual speed difference across the clutch to drive the control system based upon the current operating conditions. An exemplary embodiment of a technique for achieving this type of switching protocol is illustrated in FIG. 2.

In the exemplary embodiment of FIG. 2, switching arrangements 200, 250 for a vehicle rear eLSD are shown for right and left turns, respectively (which correspond in this example to positive and negative yaw rates, although this convention could be different in other embodiments). In the left plot 200, the right wheel is the inside wheel for a right-hand turn, and different responses (e') 200 are shown for three different conditions. If the speed of the right wheel exceeds the speed of the corresponding left wheel, for example, the modified difference 202 is shown to be equal to the difference in wheel speeds (i.e., $T_L - T_R$). If this difference is positive (e.g. such that the right wheel is rotating slower than the left wheel) but the difference does not exceed the target delta-velocity, then the difference output 204 is shown to be zero. Finally, if the left wheel slips so that the actual delta-velocity exceeds the target delta-velocity, the difference function 206 from Equation (10) can be implemented. The left-turning difference function 250 shown in the right-hand plot of FIG. 2 applies essentially the same concepts as the right-turning difference function, but with reversed signs. That is, regions 208, 210 and 212 of function 250 generally correspond to regions 206, 204, 202 of function 200, but with opposing signs. An exemplary combined difference function (e') for a rear differential 124, then, may be expressed algebraically as:

$$e'_R = \min\left(\Delta\omega_R - \min\left(\frac{y_R\psi}{r}, 0\right), 0\right) + \max\left(\Delta\omega_R - \max\left(\frac{y_R\psi}{r}, 0\right), 0\right) \quad (13)$$

Similarly, an exemplary combined difference function (e') for a front differential 112 may be expressed algebraically as:

$$e'_F = \min\left(\Delta\omega_F - \min\left(\frac{y_F\psi}{r}\cos\theta, 0\right), 0\right) + \quad (14)$$

$$\max\left(\Delta\omega_F - \max\left(\frac{y_F\psi}{r}\cos\theta, 0\right), 0\right)$$

The difference function for a center eLSD 120 can be somewhat simplified since in a turn situation, the speed of front prop-shaft 118 can be expected to exceed the speed of rear prop-shaft 122 in a no wheel-slip case, regardless of the turn direction. Therefore, an exemplary difference function (e') for a center eLSD 120 can be expressed mathematically as:

$$e'_C = \min(\omega_F - \omega_R, 0) + \max\left(\omega_F - \omega_R \cos\Theta - \frac{k'\psi}{r}\sin\Theta, 0\right) \quad (15)$$

Alternate embodiments, however, may include widely varying parameters for applying the concepts set forth herein, and the particular limits, functions and values set forth in FIG. 2 and in the various equations described herein are simply for purposes of illustration and example. Various practical embodiments may therefore vary significantly from the particular examples described above.

Turning now to FIG. 3, and exemplary electronic limited slip differential system 300 suitably includes a differential calculation module 308 that determines a target delta velocity for a front, center and/or rear differential 112/120/124 based at least in part upon indicia 119, 302 received from a yaw sensor 117 and/or other data sources as appropriate. Using the various relationships described above, differential calculation module 308 suitably determines an appropriate difference value (e') that can be provided to appropriate control logic 309 for controlling a clutch 314 or other appropriate control mechanism associated with differential 112/120/124. In various embodiments, calculation module 308 and control logic 309 are both implemented with software instructions stored in memory 116 and executing within controller 115 (FIG. 1), although alternate embodiments may implement either or both features 308 and 309 in any sort of hardware, software, firmware or combination thereof residing and executing at any location in vehicle 102. Further, calculation module 308 and control module 309 need not physically reside on the same hardware in all embodiments.

In operation, then, an electronic limited slip differential (eLSD) system 300 suitably receives data 302, 119 relating to vehicle parameters such as wheel-road angle, vehicle yaw rate, and/or the like. Similarly, feedback data 306 regarding the current state of the differential itself may be used to determine, for example, differences in wheel or axle rotation speeds using conventional techniques. Using the various relationships derived above, the eLSD 300 computes an appropriate difference value 310 relating to the target "delta velocity" between the two shafts emanating from the differential. This value, in turn, can be used to generate appropriate control signals 312 to a clutch 314 or other mechanism associated with the differential 112/120/124 to effect the desired difference in wheel spin rates.

It has therefore been shown that the control of a turning vehicle may be implemented using the equations for target delta-velocities and difference functions developed above. Velocity terms that have historically been difficult to ascertain accurately have been replaced by directly measured values for improved accuracy and reliability. In addition, for a center eLSD control, a lateral velocity term has been replaced by an empirically derived proportionality constant that can be calibrated for particular applications. Nevertheless, it is not necessary that all embodiments control wheel slippage in front, rear and center differentials, as described above. To the contrary, any of the various relationships and principles described above can be used independently of the others. For example, many 2WD or part-time 4WD embodiments may produce target delta-velocities for a front or rear differential only, but not for a center differential.

Accordingly, the shortcomings of the prior art have been overcome by providing an improved technique for correcting eLSD slip control of a turning vehicle. Relationships have been developed for determining target delta-velocities and difference functions for front, center, and rear driveline configurations. The parameters used in these relationships (e.g., yaw rate, track width, road-wheel angle, axle speed, and so forth) can be directly measured and/or empirically derived in order to avoid the use of velocity terms that are difficult to determine accurately. As such, the disclosed difference corrections can improve the driving comfort and control of a vehicle in tight turn maneuvers, such as in parking areas or the like.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of generating a slip control for an electronically-controlled limited slip differential (eLSD) that provides torque distribution to the turning wheels of a vehicle, the method comprising the steps of:
   obtaining indicia of a yaw rate of the vehicle;
   determining a target velocity difference for the turning wheels at least in part as a function of the yaw rate; and
   applying the slip control signal to the eLSD as a function of the determined target velocity difference.

2. The method of claim 1 wherein the target velocity difference is determined without measurement of a forward velocity of the vehicle.

3. The method of claim 1 wherein the determining step comprises computing a difference value as a function of at least the yaw rate and a difference in rotation speed between the turning wheels.

4. The method of claim 3 wherein the eLSD is a front differential and the difference value ($e_F$) is computed based upon the following relationship:

$$e_F = \Delta\omega_F - \frac{y_F \psi}{r}\cos\theta$$

wherein $y_F$ is the front track width of the vehicle, $\psi$ is the yaw rate, $\theta$ is a road-wheel angle of the vehicle, r is a radius of front wheel tires of the vehicle, and $\Delta\omega_F$ is the difference in rotation speed between the front wheels of the vehicle.

5. The method of claim 3 wherein the eLSD is a rear differential and the difference value ($e_R$) is computed based upon the following relationship:

$$e_R = \Delta\omega_R - \frac{y_R \psi}{r}$$

wherein $y_R$ is the rear track width of the vehicle, $\psi$ is the yaw rate, r is a radius of rear wheel tires of the vehicle, and $\Delta\omega_R$ is the difference in rotation speed between the rear wheels of the vehicle.

6. The method of claim 3 wherein the eLSD is a center differential and the difference value ($e_C$) is computed based upon the following relationship:

$$e_C = \omega_F - \omega_R \cos\Theta - \frac{k'\psi}{r}\sin\Theta$$

wherein $y_F$ and $y_R$ are the front and rear track widths of the vehicle, $\psi$ is the yaw rate, $\theta$ is a road-wheel angle of the vehicle, r is a radius of the wheels of the vehicle, and $\Delta\omega_F$ and $\Delta\omega_R$ are the differences in rotation speeds between the front and rear wheels of the vehicle, respectively.

7. The method of claim 3 wherein the determining step further comprises selecting the target velocity difference from the difference value and the difference in rotation speed based upon a direction of vehicle turn and the difference in rotation speed.

8. The method of claim 7 wherein the selecting step further comprises setting a zero target velocity difference if the absolute value of the difference in rotation speed is less than the absolute value of the computed difference value.

9. The method of claim 8 wherein the eLSD is a front differential and the target velocity difference ($e'_F$) is computed based upon the following relationship:

$$e'_F = \min\left(\Delta\omega_F - \min\left(\frac{y_F \psi}{r}\cos\theta, 0\right), 0\right) + \max\left(\Delta\omega_F - \max\left(\frac{y_F \psi}{r}\cos\theta, 0\right), 0\right)$$

wherein $y_F$ is the front track width of the vehicle, $\psi$ is the yaw rate, $\theta$ is a road-wheel angle of the vehicle, r is a radius of front wheel tires of the vehicle, and $\Delta\omega_F$ is the difference in rotation speed between the front wheels of the vehicle.

10. The method of claim 8 wherein the eLSD is a rear differential and the target velocity difference ($e'_R$) is computed based upon the following relationship:

$$e'_R = \min\left(\Delta\omega_R - \min\left(\frac{y_R \psi}{r}, 0\right), 0\right) + \max\left(\Delta\omega_R - \max\left(\frac{y_F \psi}{r}, 0\right), 0\right)$$

wherein $y_R$ is the rear track width of the vehicle, $\psi$ is the yaw rate, r is a radius of rear wheel tires of the vehicle, and $\Delta\omega_R$ is the difference in rotation speed between the rear wheels of the vehicle.

11. The method of claim 8 wherein the eLSD is a center differential and the target velocity difference ($e'_C$) is computed based upon the following relationship:

$$e'_C = \min(\omega_F - \omega_R, 0) + \max\left(\omega_F - \omega_R \cos\Theta - \frac{k'\psi}{r}\sin\Theta, 0\right)$$

wherein $\psi$ is the yaw rate, $\theta$ is a road-wheel angle of the vehicle, r is a radius of the wheels of the vehicle, and $\Delta\omega_F$ and $\Delta\omega_R$ are the differences in rotation speeds between the front and rear wheels of the vehicle, respectively, and wherein k' is a proportionality constant.

12. A digital storage medium having computer-executable instructions stored thereon for executing the method of claim 1.

13. A system for generating a slip control for an electronically-controlled limited slip differential (eLSD) that provides torque distribution to the turning wheels of a vehicle, the system comprising:
   means for obtaining indicia of a yaw rate of the vehicle and a difference in rotation speed between the turning wheels and for determining a target velocity difference for the turning wheels at least in part as a function of the yaw rate and the difference in rotation speed; and
   means for applying the slip control signal to the eLSD as a function of the determined target velocity difference.

14. The system of claim 13 wherein the eLSD is a front differential and the target velocity difference ($e_F$) is computed based upon the following relationship:

$$e_F = \Delta\omega_F - \frac{y_F \psi}{r}\cos\theta$$

wherein $y_F$ is the front track width of the vehicle, $\psi$ is the yaw rate, $\theta$ is a road-wheel angle of the vehicle, r is a radius of front wheel tires of the vehicle, and $\Delta\omega_F$ is the difference in rotation speed between the front wheels of the vehicle.

15. The system of claim 13 wherein the eLSD is a rear differential and the target velocity difference ($e_R$) is computed based upon the following relationship:

$$e_R = \Delta\omega_R - \frac{y_R \psi}{r}$$

wherein $y_R$ is the rear track width of the vehicle, $\psi$ is the yaw rate, r is a radius of rear wheel tires of the vehicle, and $\Delta\omega_R$ is the difference in rotation speed between the rear wheels of the vehicle.

16. The system of claim 13 wherein the eLSD is a center differential and the target velocity difference ($e_C$) is computed based upon the following relationship:

$$e_C = \omega_F - \omega_R \cos\Theta - \frac{k'\psi}{r}\sin\Theta$$

wherein $y_F$ and $y_R$ are the front and rear track widths of the vehicle, $\psi$ is the yaw rate, $\theta$ is a road-wheel angle of the vehicle, r is a radius of the wheels of the vehicle, and $\Delta\omega_F$ and $\Delta\omega_R$ are the differences in rotation speeds between the front and rear wheels of the vehicle, respectively.

17. An electronically-controlled limited slip differential (eLSD) system for distributing torque between a first shaft and a second shaft, the system comprising:
an electronically-controlled clutch coupling the first and second shaft and regulating the relative rotation thereof in response to a control signal;
differential calculation logic configured to receive indicia of a vehicle yaw rate and a speed difference between the first and second shafts, to determine a target velocity difference for the first and second shafts at least in part as a function of the yaw rate and the speed difference, and to provide an indication of the target velocity difference to the control logic; and
control logic coupled to the clutch and configured to provide the control signal thereto as a function of the target velocity difference.

18. The eLSD system of claim 17 wherein the eLSD is a front differential and the target velocity difference ($e_F$) is computed at least in part upon the following relationship:

$$e_F = \Delta\omega_F - \frac{y_F \psi}{r}\cos\theta$$

wherein $y_F$ is the front track width of the vehicle, $\psi$ is the yaw rate, $\theta$ is a road-wheel angle of the vehicle, r is a radius of front wheel tires of the vehicle, and $\Delta\omega_F$ is the difference in rotation speed between the front wheels of the vehicle.

19. The eLSD system of claim 17 wherein the eLSD is a rear differential and the target velocity difference ($e_R$) is computed at least in part upon the following relationship:

$$e_R = \Delta\omega_R - \frac{y_R \psi}{r}$$

wherein $y_R$ is the rear track width of the vehicle, $\psi$ is the yaw rate, r is a radius of rear wheel tires of the vehicle, and $\Delta\omega_R$ is the difference in rotation speed between the rear wheels of the vehicle.

20. The eLSD system of claim 17 wherein the eLSD is a center differential and the target velocity difference ($e_C$) is computed at least in part upon the following relationship:

$$e_C = \omega_F - \omega_R \cos\Theta - \frac{k'\psi}{r}\sin\Theta$$

wherein $y_F$ and $y_R$ are the front and rear track widths of the vehicle, $\psi$ is the yaw rate, $\theta$ is a road-wheel angle of the vehicle, r is a radius of the wheels of the vehicle, and $\Delta\omega_F$ and $\Delta\omega_R$ are the differences in rotation speeds between the front and rear wheels of the vehicle, respectively.

* * * * *